A. M. WHIPPLE.
SHIFTING RAILS FOR CARRIAGES.
No. 7,665.
Reissued May 8, 1877.
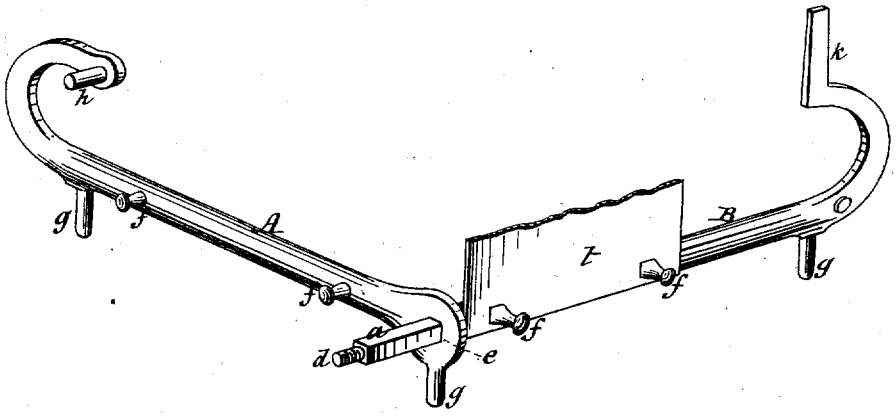
Attest:
W. R. Edelen
D. P. Cowl
Inventor:
Archibald M. Whipple
by E. E. Masson
atty
N. PETERS, PHOTO-LITHOGRAPHER, WASHINGTON, D. C.

UNITED STATES PATENT OFFICE.

ARCHIBALD M. WHIPPLE, OF NORTH ADAMS, MASSACHUSETTS.

IMPROVEMENT IN SHIFTING-RAILS FOR CARRIAGES.

Specification forming part of Letters Patent No. 176,764, dated May 2, 1876; reissue No. 7,665, dated May 8, 1877; application filed February 15, 1877.

*To all whom it may concern:*

Be it known that I, ARCHIBALD M. WHIPPLE, of the village of North Adams, of the county of Berkshire and State of Massachusetts, have invented certain new and useful Improvements in Shifting-Rails for Carriages; and do hereby declare that the following is a full, clear, and exact description thereof, reference being had to the accompanying drawings, and to the letters of reference marked thereon, making a part of this specification.

My invention consists in constructing shifting-rails for carriage-tops which can be fastened together at the seat-corners, by which construction of the rail in sections it may be made adjustable to seats of different lengths.

The drawing represents, in perspective, one end rail and one section of the back rail.

A represents the end rail, and B the section of the back rail. They are provided with lugs, rods, or straps *g*, by means of which they can be securely connected to side, back, and corner of the seat of the carriage. The rear end of the end rail is provided with a square opening, *e*, into which passes the square end *a* of the back section. The prop-block passes over the square portion *a* of the back rail, and then comes the joint-iron, that retains the top of the carriage in an elevated position. The end marked *d* is provided with a screw-thread, over which a screw-nut or other device passes, to secure the parts in place. Knobs or projections *f f* can be cast with, or attached to, the rails to retain the leather top *t* in place.

The bows of the top can be hinged to the end rail at *h*, and one end of the back rail of the seat is attached at *k* to the rear section B.

The different lengths of seat will produce only narrower or wider space between the sets of end and back rails on each side of the carriage.

Having thus fully described my invention, what I claim as new, and desire to secure by Letters Patent, is—

A new article of manufacture, namely, shifting-rails for carriage-tops, made in sections, the back rail adjustable upon the end rail, and both connected together at or near the corner of the seat by means of the prop-block support upon the back rail B passing through a mortise formed upon the extremity of the end rail A, substantially as described.

ARCHIBALD M. WHIPPLE.

Witnesses:

A. G. POTTER,

A. POTTER.